(12) United States Patent
Uchikawa (10) Patent No.: US 7,948,667 B2
(45) Date of Patent: May 24, 2011

(54) OPTICAL SCANNING ELEMENT AND IMAGE DISPLAY APPARATUS

(75) Inventor: Daisuke Uchikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 12/198,707

(22) Filed: Aug. 26, 2008

(65) Prior Publication Data
US 2009/0073526 A1    Mar. 19, 2009

(30) Foreign Application Priority Data
Sep. 13, 2007   (JP) .................... 2007-237549

(51) Int. Cl.
*G02B 26/08* (2006.01)
(52) U.S. Cl. .................................................. 359/212.1
(58) Field of Classification Search .... 359/212.1–214.1, 359/223.1–226.1
See application file for complete search history.

(56) References Cited

U.S. PATENT DOCUMENTS

| | | | |
|---|---|---|---|
| 5,513,121 A | 4/1996 | Sugawara et al. | |
| 6,400,488 B1 | 6/2002 | Nagasaka et al. | |
| 7,280,145 B2 * | 10/2007 | Takizawa et al. | 348/340 |
| 7,443,415 B2 | 10/2008 | Kuribayashi | |
| 7,475,993 B2 | 1/2009 | Takeda | |

FOREIGN PATENT DOCUMENTS

| | | |
|---|---|---|
| JP | A-6-236577 | 8/1994 |
| JP | A 9-159937 | 6/1997 |
| JP | A 2001-166250 | 6/2001 |
| JP | A 2004-177957 | 6/2004 |
| JP | A 2004-198500 | 7/2004 |
| JP | A 2005-18067 | 1/2005 |
| JP | A 2005-502910 | 1/2005 |
| JP | A 2005-70791 | 3/2005 |
| JP | A 2005-165333 | 6/2005 |
| JP | A 2006-119198 | 5/2006 |
| JP | A 2006-323354 | 11/2006 |
| JP | A 2007-41511 | 2/2007 |
| WO | WO 03/023489 A1 | 3/2003 |

* cited by examiner

Primary Examiner — Euncha P Cherry
(74) Attorney, Agent, or Firm — Oliff & Berridge, PLC (57) ABSTRACT

An optical scanning element includes: a movable member which has a reflection surface for reflecting light and rotatable around a rotation axis; and a transmitting member which has a first surface on the side opposite to the side facing the movable member and a second surface on the side facing the movable member, and transmits light entering the first surface and light entering the second surface from the reflection surface. The first surface is not parallel with the reflection surface when the movable member is in a neutral condition.

17 Claims, 11 Drawing Sheets

OPTICAL SCANNING ELEMENT AND IMAGE DISPLAY APPARATUS

BACKGROUND

1. Technical Field

The present invention relates to an optical scanning element and an image display apparatus, and more particularly to a technology of an optical scanning element included in an image display apparatus.

2. Related Art

Currently, a technology of an image display apparatus which uses laser beam source as a light source has been proposed. The laser beam source has been developed as light source for image display apparatus such as projector and display with the demand for higher output and multi-coloration of the image display apparatus. The laser beam source has several advantages such as high color reproducibility, capability of immediate turn-on, and long life compared with a UHP lamp used as a light source of a projector or the like in related-art. Moreover, when compared with a related-art light source, the laser beam source achieves higher light emission efficiency and only requires a smaller number of optical elements with reduction of energy loss. Thus, the laser beam source contributes to power-saving of the device. An example of the image display apparatus which performs laser beam scanning uses laser beam modulated according to an image signal. The image display apparatus using laser beam for scanning generally includes a light source system, a combining system for combining a plurality of color lights into one light, and a scanning system for scanning by the combined light. Since these systems may be formed by separate devices or elements, size reduction and cost reduction of the laser beam scanning type image display apparatus are expected.

A typical optical scanning device is constituted by polygon mirror or galvanomirror in related art. For display of a high-resolution image, high-speed laser beam scanning is required. On the other hand, for display of a large screen from a short distance, the scanning angle needs to be large. For meeting these requirements, MEMS (micro electro mechanical system) mirror has been currently drawing attention. The MEMS mirror capable of reducing the size of a driving unit for achieving extremely small and high-speed driving contributes to miniaturization. The typical MEMS mirror is sealed within a package for driving. For achieving high-speed and wide-range scanning, pressure within the sealed package is decreased to reduce the air resistance of the MEMS mirror due to the trade-off relationship between the scanning speed and scanning angle. It is also preferable that dust-prevention sealing package is provided since adhesion of foreign material such as dust causes breakage of the structure. The package for sealing the MEMS mirror is made of transparent material capable of transmitting light entering the MEMS mirror and light reflected by the MEMS mirror (for example, see JP-A-9-159937).

A part of light advancing to the MEMS mirror is reflected by the surface of the transparent material provided on the package. The intensity of the light reflected by the MEMS mirror is distributed by scanning, but the intensity of the light reflected by the surface of the transparent material is not distributed. In this case, the light reflected by the surface of the transparent material becomes conspicuous after entrance into a scanning area even when the intensity is low. As a result, the image quality lowers by the presence of constant spot at a position within the image regardless of the contents of the image.

SUMMARY

It is an advantage of some aspects of the invention to provide an optical scanning element capable of performing high-speed scanning at a large scanning angle and achieving high-quality display, and an image display apparatus including the optical scanning element.

An optical scanning element according to a first aspect of the invention includes: a movable member which has a reflection surface for reflecting light and rotatable around a rotation axis; and a transmitting member which has a first surface on the side opposite to the side facing the movable member and a second surface on the side facing the movable member, and transmits light entering the first surface and light entering the second surface from the reflection surface. The first surface is not parallel with the reflection surface when the movable member is in a neutral condition.

The neutral condition refers to a condition established when the driving of the movable member is stopped, for example, which is located in the middle of the angle range of the rotation of the movable member and exhibits no offset. By disposing the reflection surface and the first surface in the neutral condition of the movable member not parallel with each other, the light reflected by the first surface can be directed to a region different from the scanning area to be scanned by using the light reflected by the reflection surface. Since the light reflected by the first surface travels toward the region different from the scanning area for light scanning by the function of the movable member, lowering of the image quality can be reduced. Accordingly, the optical scanning element can perform high-speed scanning at a large scanning angle, and achieve high-quality display.

When an axis substantially parallel with the reflection surface and substantially orthogonal to the rotation axis in the neutral condition of the movable member is a neutral axis, it is preferable that the first surface is inclined to the neutral axis. According to this structure, the reflection surface and the first surface in the neutral condition of the movable member can be disposed not parallel with each other.

It is preferable that the inclination angle of the first surface with respect to the neutral axis is the maximum inclination angle of the reflection surface with respect to the neutral axis at the time of rotation of the movable member or a larger angle. According to this structure, the light reflected by the first surface can be directed toward a region different from the scanning area.

It is preferable that the first surface is inclined to the rotation axis. According to this structure, the light reflected by the first surface can be directed toward a region different from the scanning area.

It is preferable that the movable member is rotatable around a first rotation axis and rotatable around a second rotation axis substantially orthogonal to the first rotation axis. In this case, it is preferable that the first surface is inclined to at least either the first rotation axis or the second rotation axis. According to this structure, the reflection surface and the first surface in the neutral condition of the movable member can be disposed not parallel with each other.

It is preferable to further include a package which accommodates the movable member. In this case, it is preferable that the package has a contact portion contacting the transmitting member. According to this structure, the transmitting member can be fixed such that the first surface has a predetermined inclination angle by a simple structure.

It is preferable to further include a support member which supports the movable member. In this case, it is preferable that the support member is disposed on a surface not parallel with the first surface. According to this structure, the reflection surface and the first surface in the neutral condition of the movable member can be easily disposed not parallel with each other.

It is preferable that the first surface and the second surface are not parallel with each other. According to this structure, the reflection surface and the first surface in the neutral condition of the movable member can be easily disposed not parallel with each other.

An optical scanning element according to a second aspect of the invention includes: a movable member which has a reflection surface for reflecting light and rotatable around a rotation axis; and a transmitting member which has a first surface on the side opposite to the side facing the movable member and a second surface on the side facing the movable member, and transmits light entering the first surface and light entering the second surface from the reflection surface. Light reflected by the first surface is directed toward a region different from a scanning area to be scanned by using light reflected by the reflection surface by rotation of the movable member. By directing the light reflected by the first surface toward the region different from the scanning area for light scanning by the function of the movable member, lowering of the image quality can be reduced. Accordingly, the optical scanning element can perform high-speed scanning at a large scanning angle, and achieve high-quality display.

An image display apparatus according to a third aspect of the invention includes the optical scanning element described above to be employed for scanning by using light modulated according to an image signal. The image display apparatus including the optical scanning element described above can perform high-speed scanning at a large scanning angle, and achieve high-quality display. Accordingly, the image display apparatus can display large-sized and high-quality images.

It is preferable that the optical scanning element further includes an absorbing member which absorbs light reflected by the first surface. According to this structure, generation of stray light and light emission to the outside of the image display apparatus can be reduced.

It is preferable that the optical scanning element is a first optical scanning element which scans in a first scanning direction by using light modulated according to an image signal. In this case, a second optical scanning element which scans in a second scanning direction orthogonal to the first scanning direction by using light coming from the first optical scanning element, and the first optical scanning element directs light reflected by the first surface toward a position different from that of the second optical scanning element. According to this structure, the light reflected by the first surface can be directed toward a region different from a display area such as a screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments according to the invention are hereinafter described in detail with reference to the drawings.

First Embodiment

Figure 1:
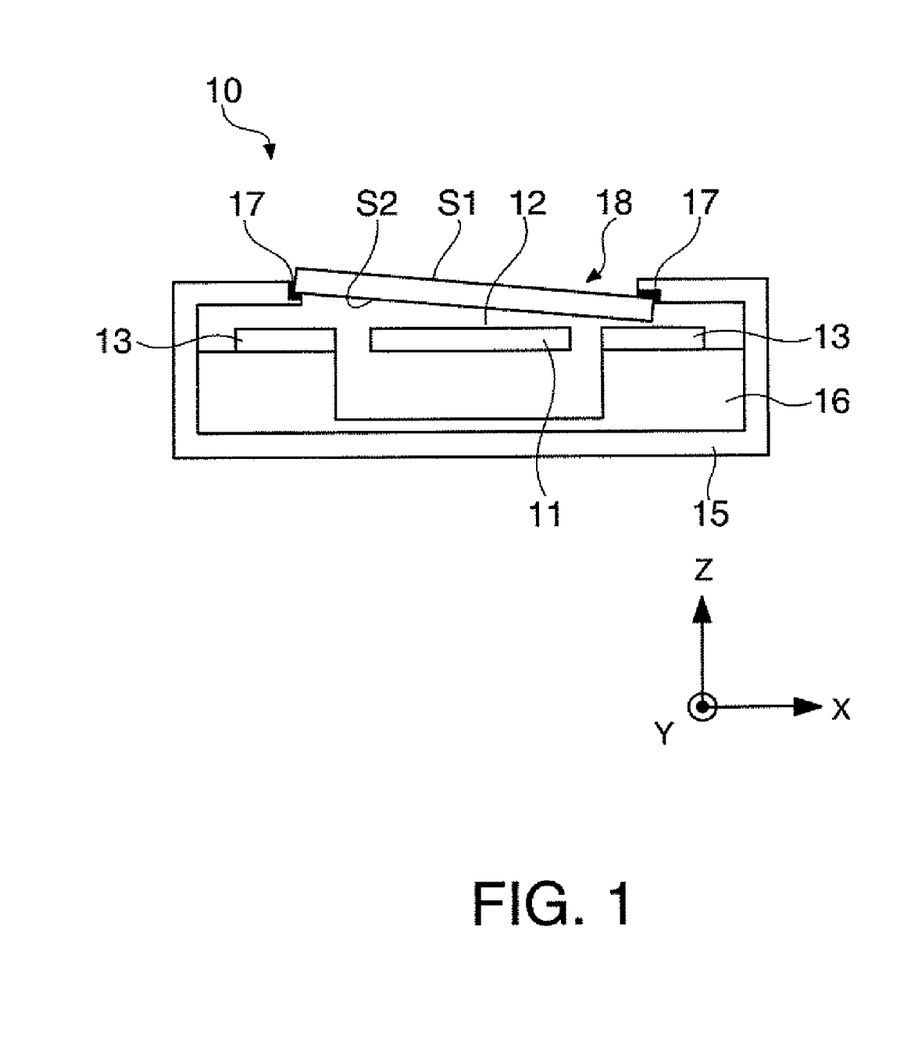
FIG. 1 is a cross-sectional view schematically illustrating an optical scanning element according to a first embodiment of the invention.

FIG. 1 is a cross-sectional view schematically illustrating an optical scanning element 10 according to a first embodiment of the invention. The optical scanning element 10 has a movable mirror 11. The movable mirror 11 is a movable member rotatable around a rotation axis. The movable mirror 11 has a reflection surface 12 for reflecting light. A mirror support member 13 is a support unit for supporting the movable mirror 11.

Figure 2:
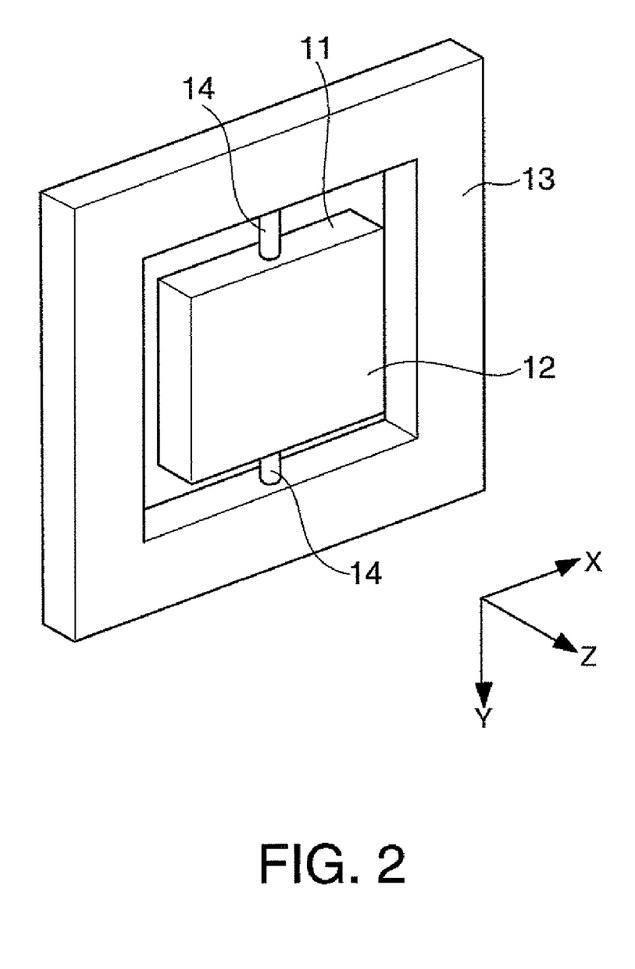
FIG. 2 is a perspective view of a movable mirror and a mirror support member.

FIG. 2 is a perspective view illustrating the movable mirror 11 and the mirror support member 13. A structure which produces driving force for driving the movable mirror 11 is not shown. The movable mirror 11 has a reflection surface 12 made of high-reflection material such as metal on a rectangular plate-shaped component. The mirror support member 13 surrounds the periphery of the movable mirror 11. The movable mirror 11 is connected with the mirror support member 13 via torsion springs 14. The movable mirror 11 rotates around the torsion springs 14 by torsion of the torsion springs 14 and restoration to the original condition. The torsion springs 14 are the rotation axis for the rotation of the movable mirror 11. Y axis corresponds to an axis parallel with the torsion springs 14. X axis corresponds to an axis orthogonal to the Y axis. The mirror support member 13 is disposed substantially parallel with the XY plane. Z axis corresponds to an axis orthogonal to the X and Y axes. The movable mirror 11 repeatedly switches a condition where the reflection surface 12 is inclined in the X axis arrow direction (+X direction) in the figure and a condition where the reflection surface 12 is inclined in the direction opposite to the X axis arrow direction (−X direction) with respect to the center position where the reflection surface 12 is substantially parallel to the XY plane.

The movable mirror 11 is driven by electrostatic driving using electrostatic force, for example. For achieving electrostatic driving of the movable mirror 11, a structure similar to that disclosed in JP-A-2004-177957, JP-A-2005-70791, JP-A-2005-165333, and JP-A-2005-18067, is employed, for example. The movable mirror 11, the mirror support member 13, the torsion springs 14, and the structure for driving the movable mirror 11 can be produced by using MEMS technology.

The movable mirror 11, the mirror support member 13, and the torsion springs 14 are accommodated in a package 15. The mirror support member 13 is disposed on a base 16 within the package 15. The base 16 is placed on the bottom of the package 15. The bottom of the package 15 is formed in parallel with the XY plane. The optical scanning element 10 is disposed on the basis of the XY plane. A transmitting member 18 is disposed opposed to the movable mirror 11. The transmitting member 18 is a parallel flat plate having a first surface S1 and a second surface S2 on the opposite side of the first surface S1.

The transmitting member 18 is disposed such that the first surface S1 is located on the side opposite to side facing the movable mirror 11, and that the second surface S2 is located on the side facing the movable mirror 11. The transmitting member 18 is inclined in the +X direction. The transmitting member 18 is made of transparent material such as glass and transparent resin. The first surface S1 of the transmitting member 18 is coated with anti-reflection coating (AR coat). The AR coat reduces reflection of light entering the first surface S1 from the outside of the optical scanning element 10 to decrease possible factors for producing stray light. The package 15 has a contact portion 17 contacting the transmitting member 18. The transmitting member 18 is positioned by engaging with the contact portion 17.

The interior of the package 15 is sealed under the reduced pressure condition. By reducing pressure inside the package 15, the air resistance of the movable mirror 11 is decreased. Moreover, by sealing the interior of the package 15, adhesion of foreign material to the movable mirror 11 or the like can be prevented. Thus, the optical scanning element 10 can perform high-speed scanning at a large scanning angle, and secure high reliability.

Figure 3:
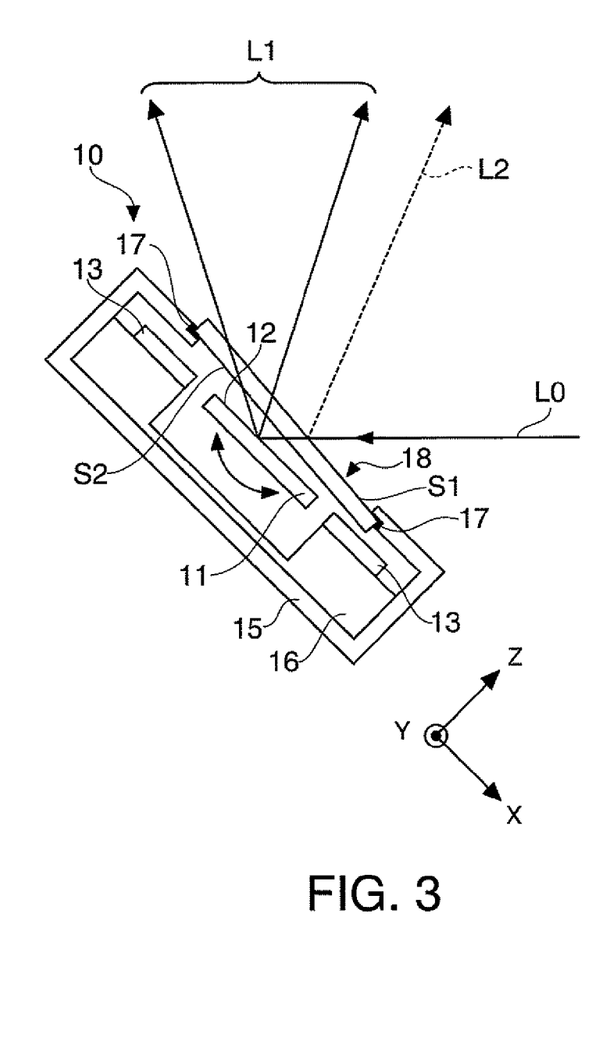
FIG. 3 illustrates behavior of light entering the optical scanning element.

FIG. 3 illustrates behavior of light entering the optical scanning element 10. Light L0 advancing toward the optical scanning element 10 enters the first surface S1 of the transmitting member 18. The light L0 having passed from the first surface S1 through the transmitting member 18 toward the second surface S2 is reflected by the reflection surface 12 of the movable mirror 11. Light L1 reflected by the reflection surface 12 enters the second surface S2 of the transmitting member 18. The light L1 having passed from the second surface S2 through the transmitting member 18 toward the first surface S1 is released from the optical scanning element 10. The optical scanning element 10 reciprocatively rotates the movable mirror 11 while reflecting light by the reflection surface 12 to scan a not-shown scanning area by using the light L1.

It is preferable that the optical scanning element 10 resonates the movable mirror 11 around the rotation axis. By the resonance of the movable mirror 11, the rotation angle of the movable mirror 11 increases. When the rotation angle of the movable mirror 11 is large, the optical scanning element 10 can perform high-speed scanning at a large scanning angle by small consumption of energy. The operation performed by the movable mirror 11 is not limited to resonance but may be other operations.

Even in the structure having the AR coat on the first surface S1, it is difficult to completely eliminate reflection on the first surface S1. Thus, a part of the light L0 entering the first surface S1 is reflected by the first surface S1. Light L2 reflected by the first surface S1 advances toward a region different from the scanning area to be scanned by the light L1 reflected by the reflection surface 12.

Figure 4:
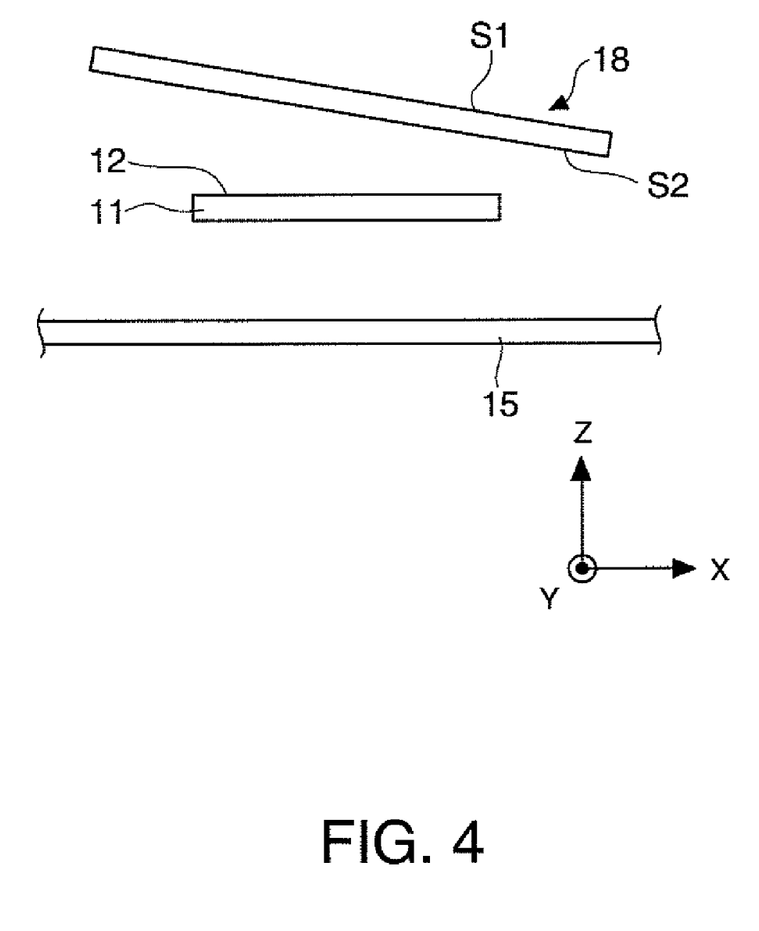
FIG. 4 illustrates inclination of a reflection surface and inclination of a first surface.

FIG. 4 illustrates the inclination of the reflection surface 12 and the inclination of the first surface S1 when the movable mirror 11 is in a neutral condition. The neutral condition refers to a condition established when the driving of the movable mirror 11 is stopped, which is located in the middle of the angle range of the rotation of the movable mirror 11 during light scanning and exhibits no offset. When the movable mirror 11 is in the neutral condition, the reflection surface 12 is disposed substantially parallel with the XY plane. It is assumed that the X axis as an axis substantially parallel with the reflection surface 12 and substantially orthogonal to the Y axis as the rotation axis in the neutral condition of the movable mirror 11 corresponds to a neutral axis. By rotation of the movable mirror 11 around the rotation axis, the reflection surface 12 switches between a condition where the reflection surface 12 is rotated clockwise and inclined with respect to the neutral condition substantially parallel with the neutral axis, and a condition where the reflection surface 12 is rotated anticlockwise and inclined with respect to the neutral condition. The first surface S1 is inclined to the neutral axis. The first surface S1 is not parallel with the reflection surface 12 while the movable mirror 11 is in the neutral condition.

Figure 5:
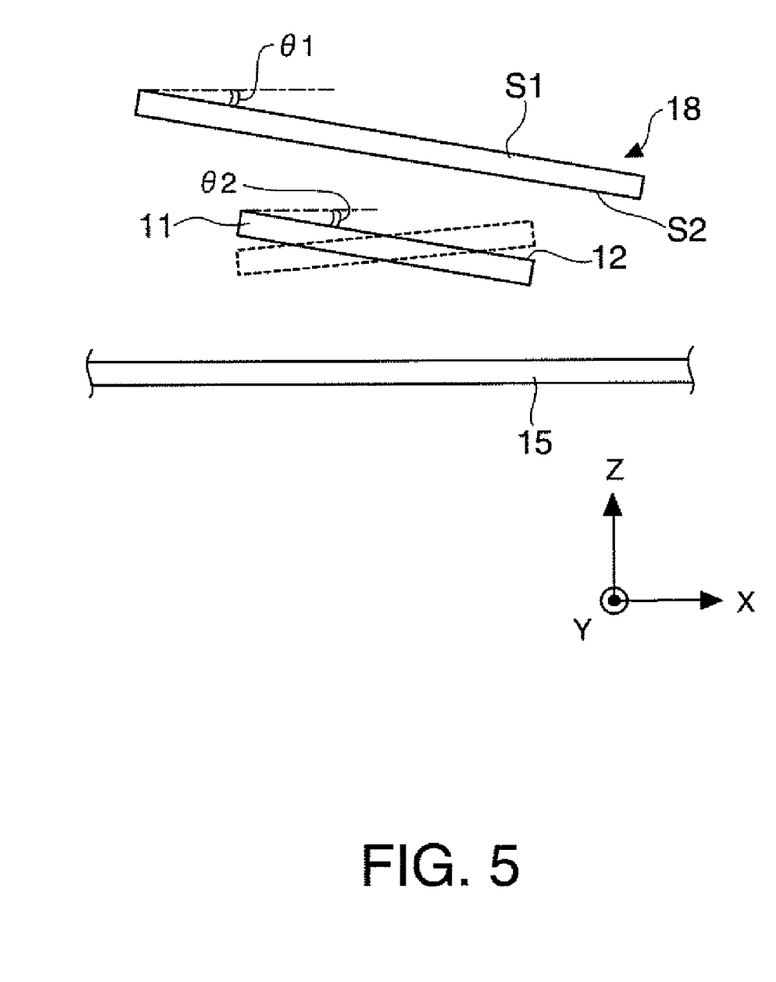
FIG. 5 illustrates inclination of the reflection surface and inclination of the first surface.

FIG. 5 illustrates the inclination of the reflection surface 12 and the inclination of the first surface S1 when the movable mirror 11 is rotated from the neutral condition. In this figure, the movable mirror 11 when the reflection surface 12 is most inclined in the +X direction is indicated by a solid line, and the movable mirror 11 when the reflection surface 12 is most inclined in the −X direction is indicated by a broken line. When an inclination angle $\theta 1$ of the first surface S1 to the X axis as the neutral axis is larger than the maximum inclination angle $\theta 2$ of the reflection surface 12 to the X axis, the light L2 reflected by the first surface S1 travels toward a region different from the scanning area of the light L1 reflected by the reflection surface 12. The reflection position on the first surface S1 is on the +X side from the reflection position on the reflection surface 12. Under the condition where the first surface S1 is inclined in the +X direction as the direction of light entrance into the optical scanning element 10 as illustrated in FIG. 3, the light L2 reflected by the first surface S1 can be directed to the region different from the scanning area of the light L1 reflected by the reflection surface 12 even when the light L2 reflected by the first surface S1 travels in parallel with the light L1 reflected by the reflection surface 12. Thus, the following relational expression holds when the first surface S1 is inclined in the +X direction as the direction of light entrance to the optical scanning element 10:

$$\theta 1 \geq \theta 2.$$

On the other hand, it is assumed that the first surface S1 is inclined in the −X direction opposite to the direction of light entrance into the optical scanning element 10. In this case, there is a possibility that the light L1 reflected by the reflection surface 12 in the condition indicated by the solid line and the light L2 reflected by the first surface S1 cross each other when the light L1 reflected by the reflection surface 12 in the condition indicated by the broken line is parallel with the light L2 reflected by the first surface S1. In this condition, the light L2 reflected by the first surface S1 advances to the scanning area of the light L1 reflected by the reflection surface 12 when $\theta 1 = \theta 2$. Thus, the following relational expression holds when the first surface S1 is inclined in the −X direction opposite to the direction of light entrance into the optical scanning element 10:

$$\theta 1 > \theta 2.$$

Thus, the light L2 reflected by the first surface S1 can be directed toward a region different from the scanning area of the light L1 reflected by the reflection surface 12 by appropriately determining the inclination angle θ1 of the first surface S1 in the manner discussed above.

Figure 6:
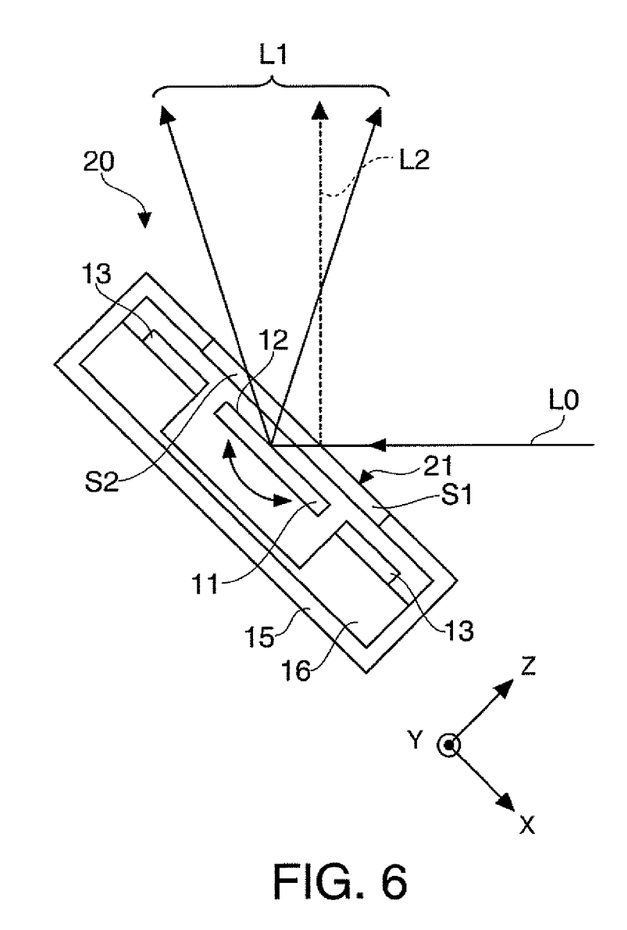
FIG. 6 illustrates behavior of light entering an optical scanning element in a comparison example for the first embodiment.

FIG. 6 illustrates behavior of light entering an optical scanning element 20 according to a comparison example for this embodiment. The optical scanning element 20 in this comparison example has a transmitting member 21 disposed substantially parallel with the reflection surface 12 in the neutral condition of the movable mirror 11. The light L2 reflected by the first surface S1 of the transmitting member 21 travels in parallel with the light L1 reflected by the reflection surface 12 in the neutral condition of the movable mirror 11. In this case, there is a possibility that the light L1 reflected by the reflection surface 12 inclined in the +X direction and the light L2 reflected by the first surface S1 cross each other. As a result, the light L2 reflected by the first surface S1 advances to the scanning area of the light L1 reflected by the reflection surface 12. The intensity of the light L1 reflected by the reflection surface 12 is distributed by scanning, but the intensity of the light L2 reflected by the first surface S1 is not distributed. Thus, the light L2 reflected by the first surface S1 becomes conspicuous after entering the scanning area even when the intensity is low. In this case, the image quality lowers by the presence of constant spot at a position within the image regardless of the contents of the image.

According to the optical scanning element 10 in this embodiment, however, the light L2 reflected by the first surface S1 advances to a region different from the scanning area of the light L1 reflected by the reflection surface 12. Thus, lowering of the image quality can be reduced. Accordingly, high-speed scanning at a large scanning angle can be performed, and high-quality display can be achieved.

Figure 7:
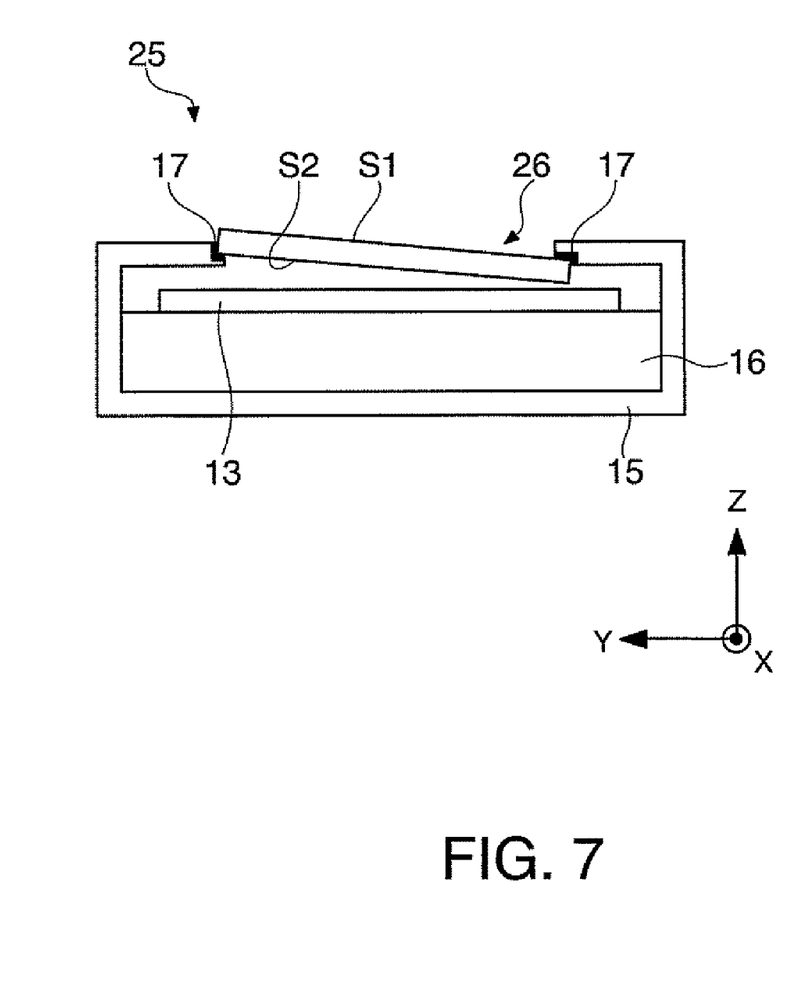
FIG. 7 is a cross-sectional view schematically illustrating an optical scanning element according to a modified example of the first embodiment.

FIG. 7 is a cross-sectional view schematically illustrates an optical scanning element 25 according to a modified example of this embodiment. The optical scanning element 25 in the modified example has a transmitting member 26 inclined to the Y axis as the rotation axis of the movable mirror 11. The light L2 reflected by the first surface S1 can be directed to a region different from the scanning area of the light L1 reflected by the reflection surface 12 by inclining the first surface S1 to the Y axis. The transmitting member 26 may be inclined to either the X axis as the neutral axis or the Y axis as the rotation axis.

The movable mirror 11 is not limited to the type which operates by electrostatic driving. For example, the movable mirror 11 may be electromagnetic driving using electromagnetic force, or driving using expansion and contraction force of piezoelectric elements. For achieving electromagnetic driving of the movable mirror 11, a structure similar to that disclosed in JP-T-2005-502910 or JP-A-2004-198500 may be used, for example.

Second Embodiment

Figure 8:
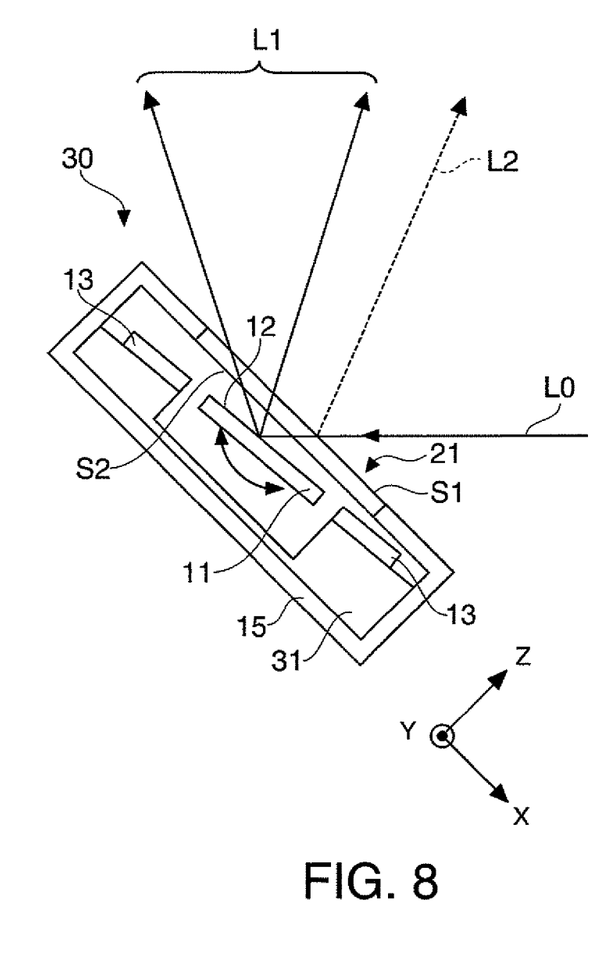
FIG. 8 is a cross-sectional view schematically illustrating an optical scanning element according to a second embodiment of the invention.

FIG. 8 is a cross-sectional view schematically illustrating a structure of an optical scanning element 30 according to a second embodiment of the invention. Reference numbers similar to those in the first embodiment are given to similar parts, and the same explanation is not repeated. The transmitting member 21 is disposed substantially in parallel with the XY plane. The surface of the base 31 on which the mirror support member 13 is placed is inclined in the −X direction with respect to the XY plane. The mirror support member 13 is disposed on a plane not parallel with the first surface S1.

When the movable mirror 11 is in the neutral condition, the reflection surface 12 is inclined in the −X direction by inclining the mirror support member 13 to the first surface S1. In this embodiment, the neutral axis is inclined to the X axis. The first surface S1 is substantially parallel with the X axis and inclined to the neutral axis. In this arrangement, the light L2 reflected by the first surface S1 can be directed to a region different from the scanning area of the light L1 reflected by the reflection surface 12 similarly to the case of the first embodiment. The mirror support member 13 may be inclined in the +Y or −Y direction. In this case, the rotation axis of the movable mirror 11 is inclined to the Y axis. The first surface S1 is substantially parallel with the Y axis and inclined to the rotation axis. In this arrangement, the first surface S1 is inclined to the rotation axis, and the light L2 reflected by the first surface S1 advances to a region different from the scanning area of the light L1 reflected by the reflection surface 12 similarly to the modified example of the first embodiment.

Third Embodiment

Figure 9:
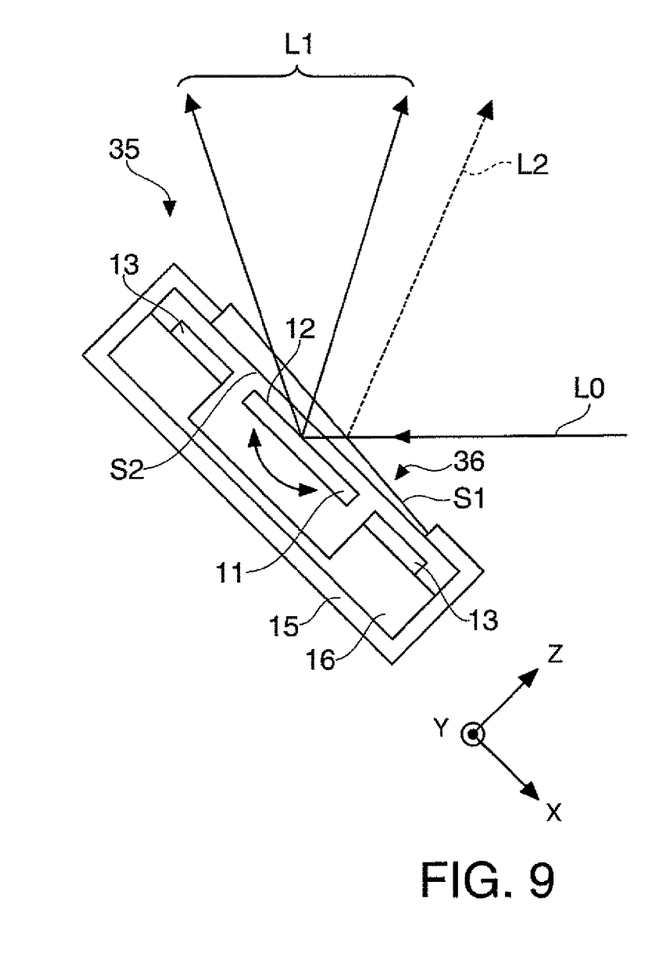
FIG. 9 is a cross-sectional view schematically illustrating an optical scanning element according to a third embodiment of the invention.

FIG. 9 is a cross-sectional view schematically illustrating a structure of an optical scanning element 35 according to a third embodiment of the invention. The optical scanning element 35 in this embodiment has a wedge-shaped transmitting member 36. Reference numbers similar to those in the first embodiment are given to similar parts, and the same explanation is not repeated. The first surface S1 of the transmitting member 36 is inclined in the +X direction with respect to the XY plane. A second surface S2 is disposed substantially parallel with the XY plane. The first surface S1 and the second surface S2 are not parallel with each other.

The transmitting member 36 has a wedge shape whose width in the Z axis direction gradually decreases in the +X direction. In this embodiment, the first surface S1 is similarly inclined to the X axis as the neutral axis. In this arrangement, the light L2 reflected by the first surface S1 can be directed to a region different from the scanning area of the light L1 reflected by the reflection surface 12 similarly to the case of the first embodiment. In this embodiment, the first surface S1 may be inclined in the +Y or −Y direction similarly to the modified example of the first embodiment. In this case, the first surface S1 is inclined to the Y axis as the rotation axis, and the light L2 reflected by the first surface S1 advances to a region different from the scanning area of the light L1 reflected by the reflection surface 12 similarly to the modified example of the first embodiment.

Figure 10:
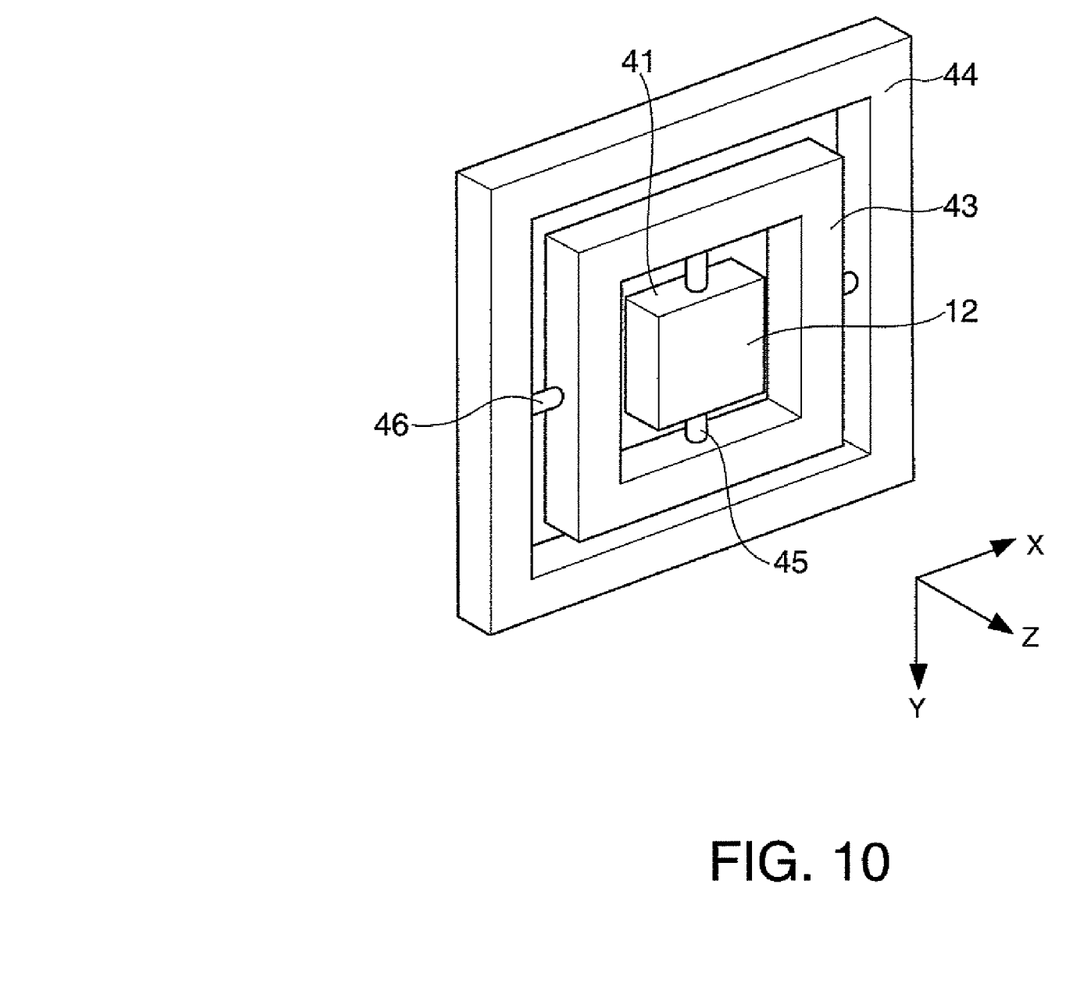
FIG. 10 illustrates a movable mirror used for light scanning in a two-dimensional directions and a structure surrounding the movable mirror.

FIG. 10 illustrates a movable mirror 41 for light scanning in a two-dimensional direction, and a structure surrounding the movable mirror 41. The optical scanning elements in the respective embodiments discussed above may include the movable mirror 11 for light scanning in a one-dimensional direction, or the movable mirror 41 for light scanning in two-dimensional direction. The movable mirror 41 is connected with a first support member 43 via first torsion springs 45. The first torsion springs 45 correspond to a first rotation axis for rotating the movable mirror 41. The Y axis is an axis parallel with the first torsion springs 45. The first support member 43 surrounds the movable mirror 41.

The first support member 43 is connected with the second support member 44 via second torsion springs 46. The second support member 44 is a support unit for supporting the movable mirror 41 and the first support member 43. The second support member 44 surrounds the first support member 43. The second torsion springs 46 correspond to a second rotation axis for rotating the first support member 43. The second torsion springs 46 as the second rotation axis are substantially orthogonal to the first torsion springs 45 as the first rotation axis. The X axis is an axis parallel with the second torsion springs 46.

When the movable mirror 11 is in the neutral condition, the reflection surface 12 is substantially parallel with the XY plane. The movable mirror 41 repeatedly switches between a condition where the reflection surface 12 is inclined to the +X direction and a condition where the reflection surface 12 is inclined in the -X direction by the rotation of the movable mirror 41 using the first rotation axis. For the Y axis as the first rotation axis, the X axis as the second rotation axis corresponds to the neutral axis. Also, the movable mirror 41 repeatedly switches between a condition where the reflection surface 12 is inclined to the +Y direction and a condition where the reflection surface 12 is inclined in the -Y direction by the rotation of the first support member 43 using the second rotation axis. For the Y axis as the second rotation axis, the Y axis as the first rotation axis corresponds to the neutral axis.

The first surface S1 of the transmitting member is inclined at least either in the Y axis as the first rotation axis or in the X axis as the second rotation axis. In this case, the first surface S1 and the reflection surface 12 in the neutral condition of the movable mirror 41 are not parallel to each other in the same manner. In this arrangement, the light L2 reflected by the first surface S1 can be similarly directed to a region different from the scanning area of the light L1 reflected by the reflection surface 12.

Fourth Embodiment

Figure 11:
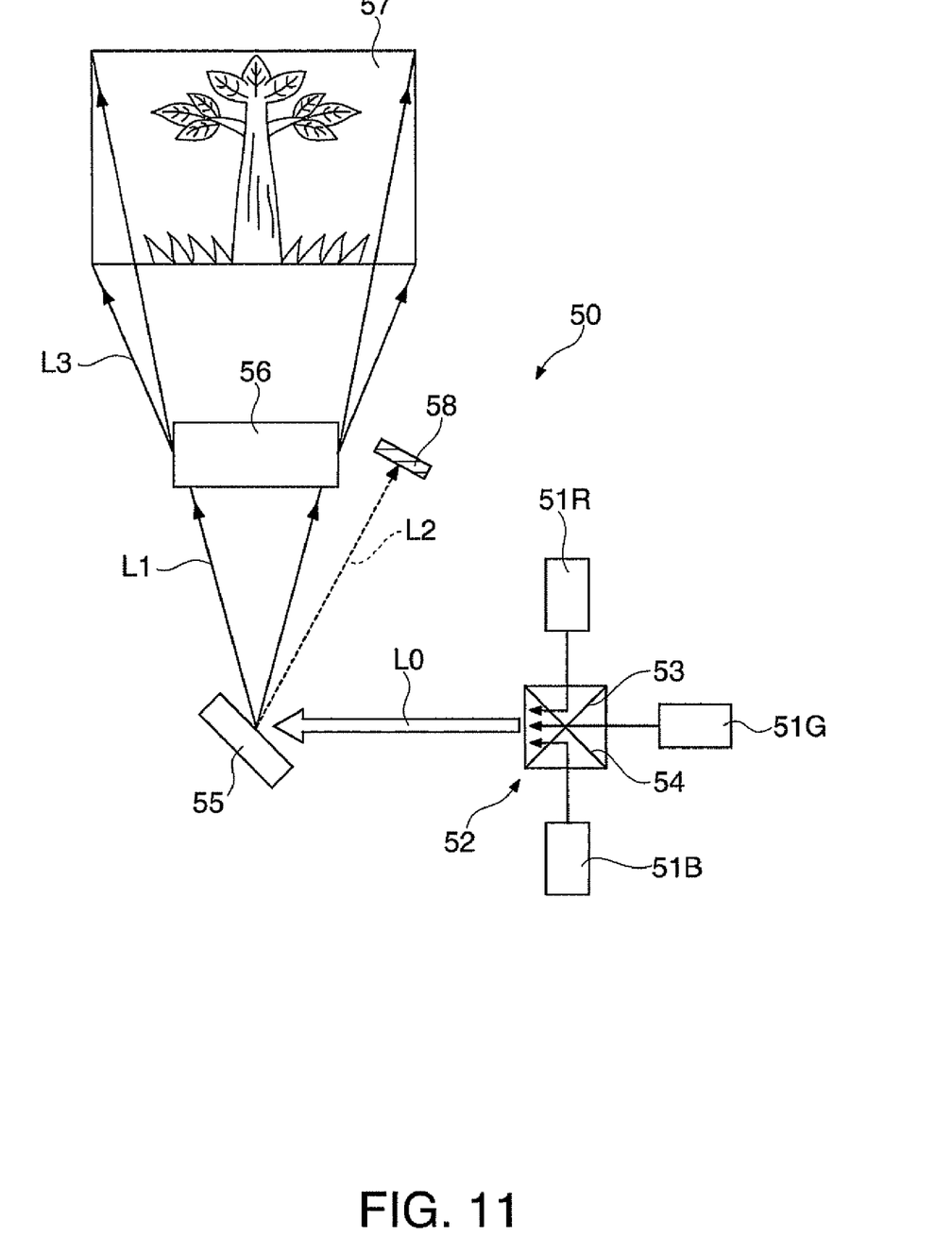
FIG. 11 schematically illustrates a projector according to a fourth embodiment of the invention.

FIG. 11 schematically illustrates a structure of a projector 50 according to a fourth embodiment of the invention. The projector 50 is an image display apparatus for displaying an image by scanning of laser beam modulated according to an image signal. Reference numbers similar to those in the first embodiment are given to similar parts, and the same explanation is not repeated. The projector 50 is a front-projection-type projector which supplies light to a screen 57 such that light reflected by the screen 57 can be viewed as an image. An R light source device 51R is a laser beam source for emitting red laser beam (R light) modulated according to an image signal. The R light emitted from the R light source device 51R enters a cross dichroic prism 52.

A G light source device 51G is a laser beam source for emitting green laser beam (G light) modulated according to an image signal. The G light emitted from the G light source device 51G enters a surface of the cross dichroic prism 52 different from the surface to which the R light enters. A B light source device 51B is a laser beam source for emitting blue laser beam (B light) modulated according to an image signal. The B light emitted from the B light source device 51B enters a surface of the cross dichroic prism 52 different from the surfaces to which the R and G lights enter. Modulation according to the image signal may be performed by either amplitude modulation or pulse width modulation.

The cross dichroic prism 52 has two dichroic films 53 and 54 disposed substantially orthogonal to each other. The first dichroic film 53 reflects the R light and transmits the G light and B light. The second dichroic film 54 reflects the B light, and transmits the R light and G light. The cross dichroic prism 52 combines the R light, G light and B light entering in different directions. The light L0 released from the cross dichroic prism 52 enters a first optical scanning element 55.

The first optical scanning element 55 scans in the horizontal direction of the screen 57 as a first scanning direction by using the light modulated according to the image signal. The first optical scanning element 55 has a structure similar to that of the optical scanning element 10 in the first embodiment (see FIG. 1). The light L1 reflected by the movable mirror (not shown) of the first optical scanning element 55 enters a second optical scanning element 56. The second optical scanning element 56 scans in the vertical direction of the screen 57 as a second scanning direction orthogonal to the first scanning direction by using the light released from the first optical scanning element 55. The second optical scanning element 56 is constituted by a galvanomirror, for example.

The size of the second optical scanning element 56 is larger than that of the first optical scanning element 55 so as to reflect the light for the scanning by the first optical scanning element 55. The frequency of light scanning by the second optical scanning element 56 is lower than that of light scanning by the first optical scanning element 55. Light L3 coming from the second optical scanning element 56 enters the screen 57. Scanning in the horizontal and vertical directions of the screen 57 by the light L3 can be performed by using the first optical scanning element 55 and the second optical scanning element 56.

The first optical scanning element 55 directs the light L2 reflected by the first surface (not shown) toward a position different from that of the second optical scanning element 56. Since the light L2 reflected by the first surface is directed to the position different from that of the second optical scanning element 56, the light L2 reflected by the first surface can advance to a region other than the screen 57.

An absorbing member 58 is disposed at a position to which the light L2 reflected by the first surface of the first optical scanning element 55 enters. The absorbing member 58 absorbs the light L2 reflected by the first surface of the first optical scanning element 55. The absorbing member 58 is disposed on a housing of the projector 50, for example. The absorbing member 58 is made of light absorption resin, for example. By the function of the absorbing member 58 for absorbing the light L2, generation of stray light within the projector 50 can be reduced. Moreover, the human eyes do not feel uncomfortable after reduction of the light L2 released to the outside of the projector 50. The housing of the projector 50 may function as the absorbing member.

By using the first optical scanning element 55 having a structure similar to that of the optical scanning element 10 in the first embodiment, high-speed scanning at a large scanning angle can be performed, and high-quality display can be achieved. As a result, large-sized and high-quality images can be displayed. The structure of the first optical scanning element 55 is not limited to that of the optical scanning element 10 in the first embodiment, but may be a structure similar to that of the optical scanning element in any embodiment discussed above.

The structure of the second optical scanning element 56 of the projector 50 may have a similar structure as that of the optical scanning element in any of the above embodiments as well as the first optical element 55. The projector 50 may include the optical scanning element having the movable mirror 41 (see FIG. 10) capable of performing light scanning in the two-dimensional direction. When the movable mirror 41 performing light scanning in the two-dimensional direction is used, the projector 50 may include only one optical scanning element for light scanning. The projector 50 may be a so-called rear projector which supplies light onto one surface of a screen such that light released from the other surface of the screen can be viewed as an image.

The respective color light source devices 51R, 51G and 51B are not limited to laser beam sources, but may be solid light sources such as light emission diode elements (LEDs), for example. The optical scanning element according to the aspects of the invention is applicable to an electronic device for laser beam scanning such as a laser printer as well as the image display apparatus.

Accordingly, the optical scanning element according to any of the embodiments of the invention is appropriately employed for an image display apparatus.

The entire disclosure of Japanese Patent Application No. 2007-237549, filed Sep. 13, 2007 is expressly incorporated by reference herein.

What is claimed is:

1. An optical scanning element comprising:
   a movable member which has a reflection surface for reflecting light and rotatable around a rotation axis; and
   a transmitting member which has a first surface on the side opposite to the side facing the movable member and a second surface on the side facing the movable member, and transmits light entering the first surface and light entering the second surface from the reflection surface, wherein
   light reflected by the reflection surface enters the second surface of the transmitting member, and
   the first surface is not parallel with the reflection surface when the movable member is in a neutral condition.

2. The optical scanning element according to claim 1, wherein:
   when an axis substantially parallel with the reflection surface and substantially orthogonal to the rotation axis in the neutral condition of the movable member is a neutral axis, the first surface is inclined to the neutral axis.

3. The optical scanning element according to claim 2, wherein the inclination angle of the first surface with respect to the neutral axis is the maximum inclination angle of the reflection surface with respect to the neutral axis at the time of rotation of the movable member or a larger angle.

4. The optical scanning element according to claim 1, wherein the first surface is inclined to the rotation axis.

5. The optical scanning element according to claim 1, wherein:
   the movable member is rotatable around a first rotation axis and rotatable around a second rotation axis substantially orthogonal to the first rotation axis; and
   the first surface is inclined to at least either the first rotation axis or the second rotation axis.

6. The optical scanning element according to claim 1, further comprising a package which accommodates the movable member,
   wherein the package has a contact portion contacting the transmitting member.

7. The optical scanning element according to claim 1, further comprising a support member which supports the movable member,
   wherein the support member is disposed on a surface not parallel with the first surface.

8. The optical scanning element according to claim 1, wherein the first surface and the second surface are not parallel with each other.

9. An optical scanning element comprising:
   a movable member which has a reflection surface for reflecting light and rotatable around a rotation axis; and
   a transmitting member which has a first surface on the side opposite to the side facing the movable member and a second surface on the side facing the movable member, and transmits light entering the first surface and light entering the second surface from the reflection surface, wherein
   light reflected by the reflection surface enters the second surface of the transmitting member, and
   light reflected by the first surface is directed toward a region different from a scanning area to be scanned by using light reflected by the reflection surface by rotation of the movable member.

10. An image display apparatus comprising the optical scanning element according to claim 1 to be employed for scanning by using light modulated according to an image signal.

11. An image display apparatus comprising the optical scanning element according to claim 9 to be employed for scanning by using light modulated according to an image signal.

12. The image display apparatus according to claim 10, wherein:
    the optical scanning element has an absorbing member which absorbs light reflected by the first surface.

13. The image display apparatus according to claim 11, wherein:
    the optical scanning element has an absorbing member which absorbs light reflected by the first surface.

14. The image display apparatus according to claim 10, wherein:
    the optical scanning element is a first optical scanning element which scans in a first scanning direction by using light modulated according to an image signal;
    a second optical scanning element which scans in a second scanning direction orthogonal to the first scanning direction by using light coming from the first optical scanning element; and
    the first optical scanning element directs light reflected by the first surface toward a position different from that of the second optical scanning element.

15. The image display apparatus according to claim 11, wherein:
    the optical scanning element is a first optical scanning element which scans in a first scanning direction by using light modulated according to an image signal;
    a second optical scanning element which scans in a second scanning direction orthogonal to the first scanning direction by using light coming from the first optical scanning element; and
    the first optical scanning element directs light reflected by the first surface toward a position different from that of the second optical scanning element.

16. The image display apparatus according to claim 12, wherein:
    the optical scanning element is a first optical scanning element which scans in a first scanning direction by using light modulated according to an image signal;
    a second optical scanning element which scans in a second scanning direction orthogonal to the first scanning direction by using light coming from the first optical scanning element; and
    the first optical scanning element directs light reflected by the first surface toward a position different from that of the second optical scanning element.

17. The image display apparatus according to claim 13, wherein:
    the optical scanning element is a first optical scanning element which scans in a first scanning direction by using light modulated according to an image signal;
    a second optical scanning element which scans in a second scanning direction orthogonal to the first scanning direction by using light coming from the first optical scanning element; and
    the first optical scanning element directs light reflected by the first surface toward a position different from that of the second optical scanning element.

* * * * *